United States Patent

[11] 3,612,777

[72] Inventor Itsuki Ban
829, Higashi-Oizumimachi, Nerima-ku,
Tokyo-to, Japan

[21] Appl. No. 824,650
[22] Filed May 14, 1969
[45] Patented Oct. 12, 1971
[32] Priority May 15, 1968, Sept. 30, 1968
[33] Japan
[31] 43/32222 and 43/84214

[54] AUTOMATIC TUNING APPARATUS FOR MAGNETIC TAPE PLAYING SYSTEM HAVING A RADIO RECEIVER
5 Claims, 8 Drawing Figs.

[52] U.S. Cl. 175/100.11, 334/24, 375/471
[51] Int. Cl. G11b 31/00, H04b 1/32, H03j 3/00
[50] Field of Search 325/471; 179/100.11; 334/18, 20, 24, 25, 39

[56] References Cited
UNITED STATES PATENTS

| | | | |
|---|---|---|---|
| 2,081,752 | 5/1937 | Linsell | 179/100.11 |
| 2,880,311 | 3/1954 | Bray | 325/471 |
| 3,437,762 | 4/1969 | Lear et al. | 179/100.11 X |
| 3,536,859 | 10/1970 | Tolar | 179/100.11 |

OTHER REFERENCES
Billboard; Apr. 22, 1967, pp. 70–71

*Primary Examiner*—Bernard Konick
*Assistant Examiner*—Raymond F. Cardillo, Jr.
*Attorney*—Jacobs & Jacobs

ABSTRACT: An automatic tuning apparatus in a magnetic tape playing system with radio receiver, the system having a tape driving device including a driving capstan, a tape recording-reproducing circuit including a magnetic head, a radio receiving circuit including a tuning element, such as a variable condenser. The automatic tuning apparatus comprises a transmission device for imparting rotation of a capstan to the operating shaft of the tuning element, a device for latching the transmission device in the position where the latter is coupled to the capstan, and a sensing circuit for producing an electrical signal in response to sensing that the radio receiving circuit is tuned to the broadcasting radio wave, the transmission device being unlatched in response to the electrical signal so that the tuning element is automatically set to the position tuning to the broadcasting radio wave.

AUTOMATIC TUNING APPARATUS FOR MAGNETIC TAPE PLAYING SYSTEM HAVING A RADIO RECEIVER

BACKGROUND OF THE INVENTION

The present invention relates to an automatic tuning apparatus in a magnetic tape playing apparatus with radio receiver and more specifically to an apparatus for rotating an operating shaft of a tuning element like a variable condenser of a radio receiving circuit by rotation force of a driving capstan of a tape driving mechanism to allow the tuning element to be automatically set to the position where the broadcasting radio wave is received.

As an audio apparatus, an arrangement where a radio receiver and a magnetic tape recording-reproducing apparatus are integrally constructed to selectively use either one of them has been well known. In such audio apparatus, it is preferable to provide an automatic tuning function for the radio receiver. Generally, for automatic tuning of the radio receiver, such method has been employed that the operating shaft of the tuning element, such as a variable condenser, is rotated by an electric motor and the motor is caused to be responsive to the tuning signal of the radio receiving circuit and thereby is deactuated. The tuning signal is, for instance, variation of the automatic volume control (AVC) voltage of the radio receiving circuit. A conventional automatic tuning apparatus to which the above-described automatic tuning means is applied may be expensive since the electric motor suitable for automatic tuning involves high expense and in which even if the motor is deactuated in response to the tuning signal, the operating shaft of the tuning element is overrun, due to the inertia of the motor so that precise tuning may not be obtained.

It is, therefore, desired to obtain a new and useful automatic tuning element which needs no expensive automatic tuning motor and in which the operating shaft of the tuning element will be rotated without causing overrun due to the inertia of the motor.

SUMMARY OF THE INVENTION

It is a principal object of the invention to provide an automatic tuning apparatus in a magnetic tape playing system with a radio receiver, whereby rotation of a driving capstan of a magnetic tape driving is imparted through a transmission device to an operating shaft of a tuning element of a radio receiving circuit to rotate the operating shaft.

Another object of the invention is to provide an automatic tuning apparatus in a magnetic tape playing system, in which the transmission device includes swingable lever means, a wheel rotatably provided on the lever means, and rotating means connected to the wheel and mounted on the operating shaft of the tuning element whereby the wheel is engaged with the capstan and rotated as lever the means is swung, and the operating shaft of the tuning element is rotated by rotation of the wheel.

A further object of the invention is to provide an automatic tuning apparatus in a magnetic tape playing system with a radio receiver, which comprises latch means latching the lever in the position where the wheel of the transmission device is engaged with the capstan, a sensing circuit producing an electrical signal in response to sensing that the radio receiving circuit is tuned to the broadcasting radio wave, whereby, the latch means releases the latch of a lever means so that the lever is returned to the position where the wheel is away from the capstan.

Yet another object of the invention is to provide an automatic tuning apparatus in a magnetic tape playing system with a radio receiver wherein rotation of the operating shaft of the tuning element is automatically reversed at every half rotation.

According to the present invention, since rotation of the operating shaft of the tuning element is effected by rotation of the capstan of the tape driving device, a motor only used for automatic tuning is not required, and the capstan is adapted to be away from the wheel to interrupt rotation of the operating shaft so that the operating shaft is rotated without causing overrun whereby an automatic tuning apparatus may be obtained such that a precise automatic tuning is effected.

Other object and advantages of the invention will be apparent from the following description of the preferred embodiments of the invention taken in conjunction with the accompanying drawings in which.

DESCRIPTION OF THE PREFERRED EMBODIMENTS

Figure 1:
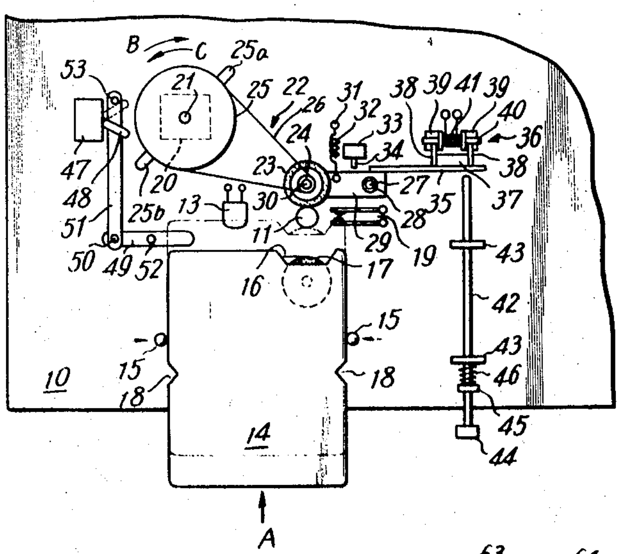
FIG. 1 is a plan view of a magnetic tape playing system with a radio receiver having an automatic tuning apparatus according the present invention.

FIG. 1 shows a magnetic tape playing system with a radio receiver, having an automatic tuning apparatus according to the invention. The apparatus, in this instance, has a deck 10. Much of the mechanism disposed beneath the deck 10 is omitted since it forms no part of the present invention. Appearing on the top of the deck 10 is a drive capstan 11 which is driven from an electric motor 12. Alongside of the capstan 11 is a magnetic head 13. The magnetic tape playing system with a radio receiver is adapted for playing an endless magnetic tape cartridge 14. Movably provided on the deck 10 are a pair of guides 15 for bringing the cartridge 14 to the playing position. The guides 15 are urged in the direction of the arrows by the bias of springs (not shown). The cartridge 14 includes a coil of a magnetic tape 16 which is withdrawn from the innermost convolution and wound upon the outer periphery of the coil, a single reel for winding the magnetic tape thereto, rotatable pinch roller 17, and two depressions 18. Upon depression of the cartridge 14 in the direction of the arrow A, the cartridge is caused to be moved to the position shown by the dashed line in FIG. 1, and then the guides 15 are received into the depressions 18 to hold the cartridge 14 in the playing position. At this time, engagement of the magnetic tape 16 with the magnetic head 13 is established while the pinch roller 17 is pressed against the capstan 11, clamping the magnetic tape therebetween with sufficient pressure so that the rotation of the capstan imparts translatory movement to the tape. The condition where the cartridge is played will be readily understood by those skilled in the art and further description thereof is not deemed necessary for an understanding of the present invention. Mounted on the deck 10 is a normally opened door switch 19 which is closed by the cartridge 14 held in the playing position.

A tuning element 20, such as a variable condenser, is fixed to the deck 10 to tune the radio receiver. An operating shaft 21 of the tuning element 20 is driven from the capstan 11 which is connected to the operating shaft 21 by a transmission device or speed reducing device generally indicated at 22. The transmission device or speed reducing device 22 comprises a wheel 23 frictionally engaged with respect to the capstan 11, pulley 24 integrally coupled to the wheel 23, a drum 25 secured to the operating shaft 21, and a belt 26 interposed between the pulley 24 and the drum 25. The wheel 23 and the pulley 24 are mounted on shaft 30 which is secured to a lever 29 mounted on a pivot 27 on the deck 10 by means of a sleeve 28. The cylindrical drum 25 is closed at the upper end thereof and opened at the lower end thereof. The tuning element 20 is covered with the drum 25. The drum 25 is provided with a belt groove (not shown) for the belt 26 at the upper periphery thereof and two projections 25*a*, 25*b* symmetrically at the lower periphery thereof. A spring 32 is interposed between the lever 29 and a pin 31 on the deck 10 and the lever 29 is urged clockwise about the pivot 27 by the bias of the spring 32. Rotation of the lever 29 by the spring 32 is prevented by engagement of the lever 29 with a microswitch 33 fixed to the deck 10. The microswitch 33 is of normally closed type and is opened by an actuator 34 when the actuator 34 is operatively depressed by the lever 29. The microswitch 33 is connected in parallel with the door switch 19 as in the manner described hereinafter. Firmly secured to the lever 29 is a leaf spring 35 which is provided with latch means generally indicated at 36.

Figure 4:
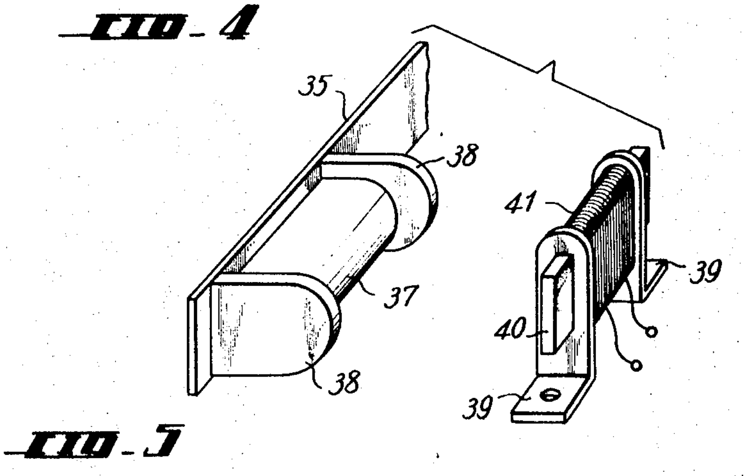
FIG. 4 is an enlarged perspective view showing latch means shown in FIG. 1.

Latch means 36 comprises a magnet 37 secured to the leaf spring 35, yokes 38 mounted on both magnetic pole portions of the magnet 37, and a core 40, as illustrated in FIG. 4, which is fixed by brackets 39 to the deck 10 opposite the yokes 38 and provided with an exciting coil 41. The yokes 38 are away from the core 40 when the lever 29 engages the microswitch 33 and are close to the core when the leaf spring 35 is manually depressed by a pushbutton rod 42 to effect magnetic attraction between the yokes and the core. When the yokes 38 and the core 40 are attracted to each other, the lever 29 is away from the microswitch 33 and clockwise rotation of the lever 29 by the spring 32 is prevented. At this time, the wheel 23 engages the capstan. The pushbutton rod 42 is slidably provided on the deck through guides 43 fixed thereto. The pushbutton rod 42 is adapted at one end thereof to be adjacent the leaf spring 35 and at the other end thereof to project from a front panel (not shown) of the magnetic tape playing system. A pushbutton 44 is mounted on the other end of the rod 42. Interposed between a collar 45 fixed to the rod 42 and the other guide 43 is a spring 46 which acts against the rod 42 to urge the rod 42 away from the leaf spring 35.

A switch 47, such as a toggle switch, is mounted on the deck 10 close to the drum 25 and an actuator 48 for the switch 47 is adapted to be operated by the projections 25*a*, 25*b* of the drum. The switch 47, as described hereinafter, functions to vary the direction of rotation of the motor 12 which drives the capstan 11. A lever 51 is provided beneath actuator 48 for the switch 47 and is pivotally connected by a pin 50 to the lever 49. The lever 49 is pivoted at the midportion thereof on a shaft 52 projecting from the deck 10. One end of the lever 49 is adjacent the region of the deck 10 in which the cartridge 14 is held in the playing position. It follows from this that the lever 49 is counterclockwise rotated about the shaft 52 by bringing the cartridge 14 to the playing position. The lever 51 is caused to be moved by rotation of the lever 49 at this time and a pin 53 mounted on the lever 51 operates the actuator 48.

Figure 2:
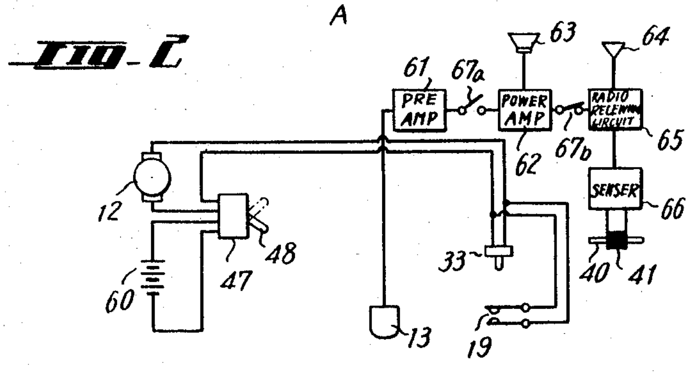
FIG. 2 is a schematic block diagram of an electric circuit for the magnetic tape playing system with a radio receiver shown in FIG. 1.

FIG. 2 is a circuit diagram for the apparatus shown in FIG. 1 and like parts similar to those in FIG. 1 are designated by like numerals.

The electric motor 12 for driving the capstan is connected through the door switch 19, the switch 47 or the microswitch 33, the switch 47 to an electric source 60. The switch 47 is a switch for reversing the motor 12 and allows the motor 12 to rotate the capstan 11 counterclockwise when the actuator 48 is in the solid line shown by FIGS. 1 and 2.

A reproducing circuit for the magnetic tape comprises the magnetic head 13, a preamplifier 61 to which the output of the magnetic head is applied, a power amplifier 62 to which the output of the preamplifier 61 is applied, and a speaker 63 driven by the output of the power amplifier 62. On the other hand, the radio receiver comprises an antenna 64, a radio receiving circuit 65 to which the radio wave received by the antenna 64 is applied, the power amplifier 62 to which the output of the radio receiving circuit 65 is applied, the speaker 63, and a sensing circuit 66 sensing the tuning of the radio receiving circuit 65. Each output of the preamplifier 61 and the radio receiving circuit 65 is selectively applied through switches 67*a*, 67*b* to the power amplifier 62. The switches 67*a*, 67*b* are cooperatively actuated and are involved in correlative relationship that the former is opened when the latter is closed, and vice versa. They are manually operated. The radio receiving circuit 65, as well known, includes a radiofrequency amplifier, a local oscillator, a mixing circuit, an intermediate frequency amplifier, and a detecting circuit or the like. The tuning element 20 (FIG. 1) is a circuit element in the radiofrequency amplifier and the local oscillator. The sensing circuit 66, for instance, is a Schmidt circuit and is actuated by the tuning signal when the radio receiving circuit 65 tunes to the radio wave to produce the electric signal. However, this electric signal is not produced when the radio receiving circuit 65 does not tune to the radio wave. The tuning signal serves, for instance, as automatic volume control (AVC) voltage for the radio receiving circuit 65. In other words, the sensing circuit 66 produces the electric signal by the extreme value of the AVC voltage when the radio receiving circuit 65 tunes to the radio wave. The electric signal is applied to the exciting coil wound upon the core 40. The drift of the current to the coil 41 drained by the output signal of the sensing circuit 66 is so predetermined that the magnetic flux produced from the coil 41 erases the magnetic flux of the magnet 37.

The operation of the apparatus shown in FIGS. 1 and 2 will now be described hereinafter.

When it is desired to listen to the radio, the switches 67*a*, 67*b*, as illustrated in FIG. 2, are so operated that the switch 67*b* is closed but the switch 67*a* is opened. In this instance, when the radio receiving circuit 65 is caused to tune to a certain broadcasting radio wave, the lever 29 and the leaf spring 35 are returned by the bias of the spring 32 to the position where the lever 29 operatively depresses the actuator 34 for the microswitch 33. Hence, the yokes 38 of the magnet 37 are away from the core 40 and the wheel 23 is away from the capstan 11. In addition, since the microswitch 33 is operated by the lever 29, the electric motor 12 is deenergized. When it is desired to tune to another broadcasting radio wave with a different frequency, the pushbutton 44 is depressed. In this manner, the lever 29 and the leaf spring 35 are swung through the rod 42 against the bias of the spring 32 and the yokes 38 are close to the core 40 to attract the latter. Thereafter, upon release of depression of the pushbutton 44, the rod 42 is returned to its original position by the bias of the spring 46, however, the lever 29 and the leaf spring 35 are prevented from their return according to the bias of the spring 32 since there is attraction of the yokes 38 with the core. As a result, the lever 29 is away from the microswitch 33 and the wheel 23 is maintained in the position where it is engaged with the capstan 11. The status described in the above is illustrated in FIG. 1. Under such condition, due to closing of the microswitch 33, the motor 12 is energized to drivingly rotate the capstan 11. At this moment, the actuator 48 for the switch 47 will be in the position shown by the solid line in FIG. 1, the motor 12 is rotated in the direction so that the capstan 11 is counterclockwise rotated (FIG. 1). Accordingly, as the capstan 11 is rotated, the wheel is clockwise rotated (FIG. 1). Rotation of the wheel 23 is imparted through the pulley 24, the belt 26 to the drum 25 to allow the latter to rotate in the direction of the arrow B. The operating shaft 21 of the tuning element 20 is rotated with rotation of the drum 25, and thus the tuning frequency of the radio receiving circuit 65 is varied. The tuning frequency corresponds to the next broadcasting radio wave, and then the AVC voltage of the radio receiving circuit 65 reaches the extreme value to produce the electric signal from the sensing circuit 66. Upon applying the electric signal to the coil 41, magnetic attraction between the core and the yokes 38 decays and, therefore, the lever 29 and the leaf spring 35 are returned to their normal position by the bias of the spring 32. Simultaneously therewith, the wheel 23 is moved away from the capstan 11 and the microswitch 33 is operated to terminate the operation of the electric motor 12. This allows the tuning element 20 to automatically set to the tuning position of the next broadcasting radio wave.

From the description as set forth in the above, it is readily understood that the radio receiving circuit 65 may be automatically tuned.

With rotation of the capstan 11, the drum 25 is rotated in the direction of the arrow B and the projection **25*b* of the drum is engaged with the actuator 48 for the switch 47 to move the actuator from the position shown by the solid line to the position shown by the dotted line whereby the drift of the current drained to the motor 12 is varied. Hence, rotation of the motor 12 is reversed so that the drum 25 is caused to be rotated in the direction of the arrow C. When the drum 25 is rotated about 180° in the direction of the arrow C, the projection 25*a* is in turn engaged with the actuator 47 for the switch 48 to move it from the position shown by the dotted line to the position shown by the solid line. In such a manner, the switch 47 is changed over to vary the rotary direction of the motor 12 whenever the drum 25** is rotated about 180°.

The actuator 48 for the switch 47 when the endless magnetic tape cartridge 14 is held in the playing position, is automatically set through the levers 49, 51 and the pin 53 to the position shown by the solid line in FIG. 1. Thus, in case that the endless magnetic tape cartridge 14 is to be reproduced, the motor 12 is rotated at all times in the direction that the capstan 11 is rotated so as not to interfere with running of the magnetic tape 16. Switches **67*a*, 67*b* are automatically operated so as to close the former while the latter is opened in order to reproduce the endless magnetic tape cartridge 14**.

Figure 3:
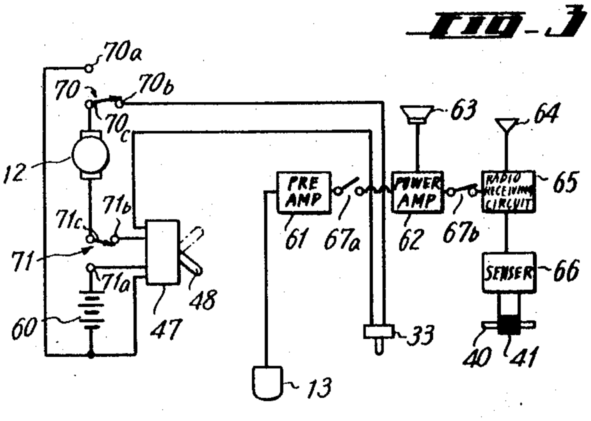
FIG. 3 is a schematic block diagram showing an alternative form of the electric circuit illustrated in FIG. 2.

FIG. 3 shows a modification of the circuit shown in FIG. 2 and like parts shown in FIG. 2 are designated by like numerals. The circuit shown in FIG. 3 is similar to that illustrated in FIG. 2 except that switches 70 and 71 may be substituted for the door switch 19 and are cooperatively operated by the endless magnetic tape cartridge when the latter is held in the playing position as in the manner of the door switch 19. The one switch 70 has two fixed contacts **70*a*, 70*b* and a movable contact 70*c*. The other switch 71 has two fixed contacts 71*a*, 71*b* and a movable contact 71*c*. The switches 70, 71 are respectively incorporated, as shown in FIG. 3 in a current supply circuit for the motor 12. The switches 70, 71 are normally under condition that the fixed contact 70*b* and the movable contact 70*c* as well as the fixed contact 71*b* and the movable contact 71*c* are closed. Hence, the radio receiving circuit 65 is automatically tuned the microswitch 33 is closed, and the motor 12 is rotated, as in the manner of the circuit shown in FIG. 2, in the direction corresponding to the change over condition of the switch 47**.

When the endless magnetic tape cartridge is played, the switches 70, 71 are changed over by setting the cartridge to the playing position so that the fixed contact **70*a* is brought in contact with the movable contact 70*c* as well as the fixed contact 71*a* is brought in contact with the movable contact 71*c* whereby the motor 12 is connected to the electrical source independently of the switch 47. As a result, the motor 12 is rotated only in one direction. In this instance, the drift of the current applied to the motor 12 is so predetermined that the rotary direction of the motor 12 is such that the capstan 11 (FIG. 1**) is rotated counterclockwise.

As described in the foregoing, with the use of the circuit shown in FIG. 3, the capstan 11 is rotated counterclockwise independently of the switch 47 in playing the endless magnetic tape cartridge. From this it is readily understood that the levers 49, 51 as shown in FIG. 1 may be omitted.

Figure 5:
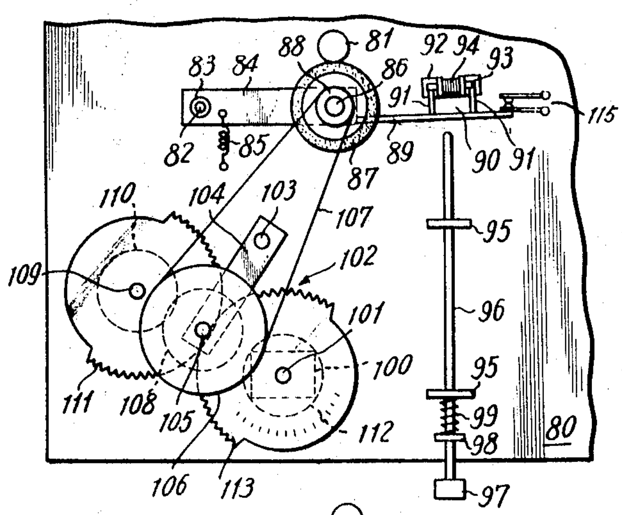
FIG. 5 is a plan view of an alternative embodiment of the automatic tuning device according to the present invention.

FIG. 5 is a presentation of an alternative embodiment of the apparatus according to the present invention. In this instance, only the parts required for the purpose of understanding of the invention are shown in FIG. 5. Reference numeral 80 is a deck corresponding to the deck 10 (FIG. 1) from which extends a capstan 81 rotatably operable by an electric motor (not shown). A lever 84 is pivotally mounted through a sleeve 83 on a shaft 82 fixed to the deck 80. The lever 84 is biased by a spring 85 to be rotated clockwise about the shaft 82. A shaft 86 is fixed to the lever 84 and rotatably carries the wheel 87 and the pulley 88. The wheel 87 is integrally coupled to the pulley 88 and engaged with the capstan 81 to rotate by rotation force of the capstan, however, normally the wheel 87 is maintained away from the capstan 81 by the bias of the spring 85. Latch means corresponding to latch means 36 in FIG. 1 is provided to a leaf spring 89 one end of which is secured to the one end of the lever 84. Latch means comprises a magnet 90 fixed to the leaf spring, yokes 91 mounted on both magnetic poles of the magnet 90, and a core 93 which is mounted on the deck 80 through brackets 92 to oppose the yokes 91 and is provided with an exciting coil 94. In FIG. 5, the yokes 91 are attracted to the core 93, but normally are maintained in the position away from the core by the bias of the spring 85. In opposition to the leaf spring 89 is a top end of a pushbutton rod 96 which is slidably supported by guides 95 on the deck 80. The pushbutton rod 96 includes a pushbutton 97 and a collar 98 between which and the other guide 95 is interposed a spring 99. The spring 99 urges the pushbutton rod 96 by compressive elasticity thereof in the direction away from the leaf spring 89.

A tuning element 100 in the radio receiving circuit (not shown) is firmly mounted on the deck 80 and the operating shaft 101 of the tuning element 100 is coupled through a transmission device or speed reducing device generally indicated at 102 to the capstan 81. The transmission device or speed reducing device 102 comprises the wheel 87, the pulley 88, a pulley 106 rotatably mounted through a shaft 105 on a lever 104 swingably pivoted to a shaft 103 provided on the deck 80, a belt 107 trained around the pulleys 106 and 88, a gear wheel 108 integrally formed with the pulley 106, a gear wheel 110 rotatably provided on a shaft 109 mounted on the deck 80 and selectively meshing with the gear wheel 108, a gear wheel 111 integrally formed with the gear wheel 110, a gear wheel 112 firmly mounted on the operating shaft 101 and selectively meshing with the gear wheel 108, and a gear wheel 113 integrally formed with the gear wheel 112 to mesh with the gear wheel 111.

Figure 6:
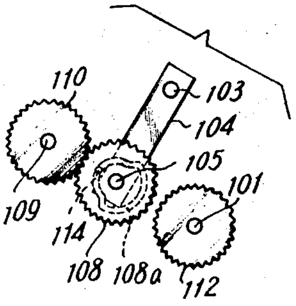
FIG. 6 is a plan view showing a portion of the transmission device illustrated in FIG. 5.

The details of the gear wheel 108, 110 and 112 are illustrated in FIG. 6. The gear wheel 108 is provided with a cam groove **108*a* thereunder in which a pin 114 mounted on the deck 80 is received. The gear wheel 108 is rotated by rotation force of the capstan 86 through the wheel 87, the pulley 88, the belt 107, and the pulley 106 so that the gear wheel 108 is regulated by the cam groove 108*a* and the pin 114 to swing with the lever 104 about the shaft 103. In FIG. 6, there is shown engagement of the gear wheel 108 with the gear wheel 110, however, when the gear wheel 108 is rotated clockwise about 90°, the gear wheel 108 is away from the gear wheel 110 since the gear wheel 108 is regulated by the cam groove 108*a* and the pin 114. Further rotation of the gear wheel 108 causes it to mesh with the gear wheel 112. Upon meshing with the gear wheel 112, the gear wheel 108 is still rotated about 180° whereby the gear wheel 108 is away from the gear wheel 112 since the former is regulated by the cam groove 108*a* and the pin 114, and the gear wheel 108 meshes with the gear wheel 110. As mentioned in the above, the cam groove 108*a* is so designed that the gear wheel 108 selectively meshes with the gear wheel 110 or 112 whenever the gear wheel 108 is rotated about 180°. At the time when the gear wheel 108 meshes with the gear wheel 110, the gear wheel 111 is rotated as the gear wheel 108 is rotated and rotation of the gear wheel 111 is transmitted through the gear wheel 113 to the operating shaft 101 of the tuning element 100. The operating shaft 101 is rotated to the right when the gear 108 is rotated counterclockwise in relation to FIG. 5. When the gear wheel 108 meshes with the gear wheel 112, rotation of the gear wheel 108 is imparted through the gear wheel 112 to the operating shaft 101 of the tuning element 100. At this moment, the gear wheel 108 is clockwise rotated, the same as in the foregoing, and the operating shaft 101 is rotated to the left as reversed to the above. In other words, it is understood that whenever the operating shaft 101 of the tuning element 100 is half rotated, its rotation is reversed although the capstan 81 is rotated in, one direction at all times. In this instance such as in FIG. 5, the teeth are formed in the gear wheels 111, 113 at the portion thereof to be substantially used, however, they may be formed entirely of these gear wheels. Mounted on the deck 80 is a normally opened switch 115 which is used for controlling the supply of current to an electric motor (not shown) for rotating the capstan 81 and is operated by the leaf spring 85**.

The mode of operation of the transmission device or speed reducing device shown in FIG. 5 and FIG. 6 will be detailed hereinafter.

The wheel 87 is normally positioned away from the capstan 81 by the bias of the spring 85 and the leaf spring 89 is in the position shown by the dotted line of FIG. 5. The lever 84 and the leaf spring 89 are caused to be rotated about the axis 82 against the bias of the spring 85 due to depression of the pushbutton 97. At this point, the yokes 89 of the magnet 90 are attracted to the core 93 and the leaf spring 89 and the lever 84 are thus not returned to their original position based on the bias of the spring 85 when the depression of the pushbutton 97 is released. Under the attraction of the yokes 89 with the core 93, the wheel 87 is engaged with the capstan 86 and the switch 115 is operated and closed by the leaf spring 89. Hence, the electric motor (not shown) is actuated to rotate the capstan 81 and rotation thereof is imparted through the speed reducing device 102 to the operating shaft 101 of the tuning element 100. As a result, the tuning element 100 varies the tuning frequency of the radio receiving circuit (not shown). When the tuning frequency of the radio receiving circuit corresponds to that of the broadcasting radio wave, by the tuning signal from the radio receiving circuit, the exciting coil 94 of the core 93 is energized as in the same manner of the apparatus in FIGS. 1 and 2. Accordingly, attraction between the yokes 91 and the core 93 is interrupted and the lever 84 and the leaf spring 89 are returned to their normal position by the bias of the spring 85 at the same time the wheel 87 is away from the capstan 81 to open the switch 115 to thus deactuate the motor (not shown). Thus, the tuning element 100 is automatically set to the position tuning to the broadcasting radio wave.

It may be readily understood that the device shown in FIGS. 5 and 6, as above mentioned, is adapted to be automatically tuned as like the apparatus illustrated in FIGS. 1 and 2.

Figure 7:
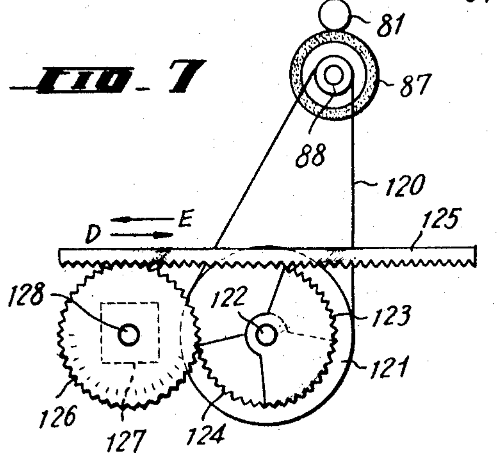
FIG. 7 is a plan view of a modified form of the transmission device different from that shown in FIG. 5.
Figure 8:
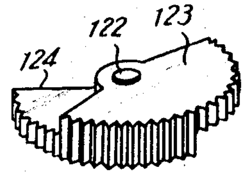
FIG. 8 is an enlarged perspective view of the gears shown in FIG. 7.

FIG. 7 shows an alternative form of a speed reducing device in place of the transmission device or speed reducing device 102 shown in FIG. 5. For the purpose of convenience of understanding, like parts shown in FIG. 5 are designated by like numerals. Rotation of the capstan 81 is transmitted through the wheel 87, the pulley 88, a belt 120 to a pulley 121. Semicircular gears 123, 124 the details of which are shown in FIG. 8 are mounted on a rotary shaft 122 of the pulley 121. The gears 123 and 124 are integrally formed and partially overlied to each other. A rack 125 is provided to be slided in the direction of the arrows D, E and adapted to mesh with the gear 123. A pinion wheel 126 is mounted on an operating shaft 128 of a tuning element 127 in the radio receiving circuit (not shown) and meshes with the rack 125. The pinion wheel 126 also may mesh with the gear 124. When the capstan 81 is kept on its rotation counterclockwise in FIG. 7, the pulley 121 is also kept on its rotation through the wheel 87, the pulley 88, the belt 120. Similarly, the gears 123, 124 are rotated with the pulley 121. Upon initiating rotation of the pulley from the position shown in FIG. 7, the gear 124 firstly meshes with the pinion wheel 126 so that the operating shaft 128 of the tuning element 127 is rotated to the left through the wheel 126. For this period, the gear 124 does not mesh with the rack 125 but only the pinion wheel 126 meshes therewith. Hence, the rack 125 is moved in the direction of the arrow E by rotation of the pinion wheel 126. Approximate half rotation of the operating shaft 128 releases engagement of the gear 124 with the pinion wheel 126 while the gear 123 meshes with the rack 125. As a result, the rack 125 is moved in the direction of the arrow D reversed to that direction as before. With movement of the rack 125, the operating shaft 128 is initiated to rotate to the right through the pinion wheel 126. Approximate half rotation of the operating shaft 128 releases engagement of the gear 123 with the rack 125 whereas the gear 124 meshes with the pinion wheel 126. In this manner, the operating shaft 128 of the tuning element 127 reverses rotary direction thereof at every half rotation thereof by rotation of the capstan 81 in one direction. It may be naturally understood that upon release of abutment of the wheel 87 against the capstan 81, rotation of the operating shaft 128 is terminated.

The invention and its attendant advantages will be understood from the foregoing description. Various changes, modifications or improvements may be made within the intention of the scope of the appended claims without limitation of the invention to the embodiments illustrated in the drawings.

What is claimed is:

1. In a magnetic tape playing system with a radio receiver, the system having a tape driving device including a capstan and an electrical motor driving the capstan, a tape recording and reproducing circuit including a magnetic head, and a radio receiving circuit including a tuning element provided with an operating shaft, an automatic tuning apparatus comprising: a transmission device provided between said capstan and said operating shaft of said tuning element, said transmission device including lever means mounted for pivotal movement, and a rotatable wheel mounted on said lever means, said wheel being positioned adjacent said capstan; spring means biasing said lever means to a first position where said wheel is remote from said capstan; operating means for moving said lever means against the bias of said spring means from said first position to a second position where said wheel is engaged with said capstan; latch means for magnetically attracting said lever means and for maintaining said lever means in said second position by magnetic force, said operating shaft of said tuning element being adapted to be rotated by rotation of said capstan while said latch means is latching said lever means; a sensing circuit for producing an electrical signal in response to sensing that said radio receiving circuit is tuned to a broadcasting radio wave, and means for applying said electrical signal to said latch means; said latch means being adapted to release said lever means in response to said electrical signal whereby said lever means is returned to the first position at the same time that rotation of said operating shaft of said tuning element is interrupted and said tuning element is automatically set to the receiving position for the broadcasting wave.

2. Apparatus as described in claim 1 wherein said transmission device comprises a first pulley coaxially mounted with said wheel and being rotatable therewith, a second pulley, a belt interposed between said first pulley and said second pulley, a gear coaxially mounted on said operating shaft, and first and second gear means for imparting rotation of said second pulley to said gear, said first and second gear means being operatively associated with said second pulley for alternately rotating said gear in the same direction of rotation and in the opposition direction of rotation as that of said second pulley, and means for alternately operating said first or second gear means whenever said second pulley is half rotated.

3. Apparatus as described in claim 1 wherein said latch means comprises a magnet firmly fixed to said lever means, yokes mounted on both magnetic poles of said magnet, a core immovably provided within said system adjacent said yokes, and an exciting coil wound upon said core for producing a magnetic flux to erase the flux of said magnet, said exciting coil being adapted to be energized by said electrical signal.

4. Apparatus as described in claim 1 wherein said transmission device comprises a pulley coaxially mounted with said wheel, rotary means coaxially mounted with said operating shaft and a belt interposed between said pulley and said rotating means to transmit rotary movement of said capstan to said tuning element.

5. Apparatus as described in claim 4 wherein said rotary means has two projections symmetrically disposed with relation to said operating shaft, and a switch for the rotary direction of said electric motor is provided adjacent said rotary means, said projections being adapted to operate an actuator for said switch to allow rotation of said operating shaft of said tuning element to be reversed at every half rotation.